United States Patent [19]

Best et al.

[11] Patent Number: 5,244,957
[45] Date of Patent: Sep. 14, 1993

[54] METAL PROTECTING COMPOSITIONS

[75] Inventors: Robert D. M. Best, Brussels, Belgium; Jean F. Brument, Rouen, France

[73] Assignee: Exxon Chemical Patents Inc., Linden, N.J.

[21] Appl. No.: 679,697

[22] Filed: Apr. 3, 1991

Related U.S. Application Data

[63] Continuation of Ser. No. 395,026, Aug. 17, 1989, abandoned.

[51] Int. Cl.$^5$ ................................................ C08K 3/30
[52] U.S. Cl. ..................................... 524/418; 524/564
[58] Field of Search ............................... 524/418, 564

[56] References Cited

U.S. PATENT DOCUMENTS

| | | | |
|---|---|---|---|
| 3,453,124 | 7/1969 | Wurstner | 106/14 |
| 3,492,231 | 1/1970 | McMillen | 252/33 |
| 3,565,672 | 2/1971 | Adams | 117/75 |
| 3,565,843 | 2/1971 | Kassinger et al. | 260/28.5 |
| 3,661,622 | 5/1972 | Rogers | 117/75 |
| 3,746,643 | 7/1973 | Rogers | 252/33 |
| 3,816,310 | 6/1974 | Hunt | 252/32.7 |
| 4,150,192 | 4/1979 | Downey | 524/418 |
| 4,191,798 | 3/1980 | Schumaker | 524/418 |
| 4,289,669 | 9/1981 | Lakshmanan | 524/270 |

FOREIGN PATENT DOCUMENTS

| | | |
|---|---|---|
| 0271254 | 6/1988 | European Pat. Off. |
| 0295108 | 12/1988 | European Pat. Off. |
| 1249144 | 10/1971 | United Kingdom |

OTHER PUBLICATIONS

Chemical Abstracts"Coatings", vol. 101, No. 6, Aug. 6, 1984, p. 79 Abstract No. 39974z & Jap. 59-43075.

*Primary Examiner*—John C. Bleutge
*Assistant Examiner*—Mark Sweet
*Attorney, Agent, or Firm*—R. A. Maggio

[57] ABSTRACT

A blend of from 10 to 90 parts by Weight of a basic calcium sulphonate and from 90 to 10 parts by weight of a terpolymer of 50 to 99 wt. % of an olefin containing from 2 to 4 carbon atoms, 1 to 30 wt. % of an unsaturated ester which is a vinyl ester of a carboxylic acid or an ester of acrylic or methacrylic acid and 1 to 20 wt. % of an unsaturated carboxylic acid is particularly useful for car undercoatings for corrosion and chip resistance which may be applied as high solids coatings.

2 Claims, No Drawings

METAL PROTECTING COMPOSITIONS

This is a continuation of application Ser. No. 395,026, filed Aug. 17, 1989, now abandoned.

The present invention relates to new compositions and their use as coating materials particularly for the undercoating of automobiles to prevent chipping and corrosion.

Automobile undercoatings typically consist of several layers deposited on the phosphorised metal. First the phosphorised metal is painted, it is subsequently coated with a layer of a polyvinyl chloride plastisol, generally applied as a dispersion, which is cured to provide a rendered chip resistant coating. Frequently the plastisol is filled with a substantial amount of filler typically calcium carbonate. Once the polyvinyl chloride layer is applied it may itself be coated with a layer of wax to inhibit decomposition of the polyvinyl chloride and consequential corrosion. There may also be incorporated an anticorrosion material which may be a thixotropic calcium sulphonate.

These coating systems are complex and furthermore there is a desire to replace the polyvinyl chloride to avoid toxicological problems in the disposal of vehicles by combustion. The need to fill the polyvinyl chloride to obtain the viscosity and abrasion resistant characteristics necessary for application and curing of the coating also requires that relatively thick and heavy layers be used, which is expensive and undesirable given the general desire to reduce the weight of vehicles.

The polyvinyl chloride layer furthermore provides very limited anticorrosion properties and its flexibility under changing temperature and stress conditions can be unsatisfactory.

Various alternate coating compositions have been tried but have not proved satisfactory since they do not satisfy one or more of the requirements, particularly the ability to be applied as a high solids content solution or dispersion which can be readily heat treated to give a coating with sufficient adhesion to metal which does not sag during heat treating and which has sufficient temperature and stress endurance. It is highly desirable to have a coating that can be applied at a high solids level by the traditional spraying techniques at ambient temperature so reducing the use of hazardous solvents which require elaborate and expensive techniques for their removal. Furthermore, it would be highly desirable to have a single treatment which provides both anticorrosion properties and chip resistance to the underside of the vehicle.

Numerous coating compositions have been proposed many of which have been used commercially, for the coating of ferrous and non-ferrous metals, which are susceptible to rust or corrosion, to prevent or to inhibit such rust or corrosion. As has long been known, rust or corrosion is caused by environmental conditions, such as contact of the metal surfaces by water; by air, particularly moist air; and by various chemicals or other materials which come into contact with the metal surfaces.

While, in most cases, ferrous metals such as iron and steels represent the areas where rust and corrosion problems are particularly encountered, various non-ferrous metals, for instance, aluminium, are also subject to corrosion.

The use of corrosion-inhibiting coating compositions, which contain thixotropic, or grease-like or gel-like thixotropic, alkaline earth metal organic sulfonates complexed with alkaline earth metal carbonates, with or without admixture with polymers, resins or waxes, in a carrier or diluent of nonvolatile or volatile (or mixtures of nonvolatile and volatile) hydrocarbons and or other liquid solvents, is known and is disclosed in U.S. Pat. Nos. 3,453,124; 3,492,231; 3,565,672; 3,565,843; 3,661,622; 3,746,643; and 3,816,310; and United Kingdom Patent 1249144 and various patents referred to in the specifications of such patents. Various of such corrosion-inhibiting compositions are proposed for a variety of purposes, some including automobile and truck body undercoatings.

We have found however that these blends are unsatisfactory in that they have inadequate adhesion to metal or cannot be applied as high solids content solutions. Furthermore although these compositions can provide adequate anticorrosion properties they do not provide chip protection to metal having poor resistance to continuous attack by abrasive particles as for example the exposure of the underside of vehicles to particles from the road surface. Furthermore many of the compositions do not have adequate stress cracking resistance over the temperature range and conditions to which vehicles are subjected (i.e. as low as $-40°$ C.).

We have now developed a novel composition which satisfies the above requirements.

The present invention therefore provides a blend of from 10 to 90 parts by weight of a basic calcium sulphonate and from 90 to 10 parts by weight of a terpolymer of 50 to 98 wt. % of an olefin containing from 2 to 4 carbon atoms, 1 to 30 wt. % of an unsaturated ester which is a vinyl ester of a carboxylic acid or an ester of acrylic or methacrylic acid and 1 to 20 wt. % of an unsaturated carboxylic acid optionally containing other materials.

It is preferred that the terpolymer is of ethylene, vinyl acetate and acrylic or methacrylic acid and our preferred materials are described in European Patent application 87310418.6.

The term basic calcium sulfonate is descriptive of dispersions containing an excess of metal over the stoichiometric required to neutralise the dispersing agent, in this case, sulphonic acid. The basic calcium sulphonate used in the blend of the present invention is preferably a viscous composition dispersed in mineral spirit. Such compositions are known in thixotropic and newtonian form. The preferred calcium sulphonate is non-thixotropic because this allows the production of high solids, low viscosity coating solutions. The calcium sulphonate generally consists of the following materials in the amounts stated:

|  | Suitable | Preferred |
| --- | --- | --- |
| Diluent* | 2–80 | 20–70 |
| Oil-soluble dispersing agent* | 5–55 | 6–35 |
| Calcium carbonate* | 1–45 | 5–30 |

*The specific nature of these materials will be described hereinafter in connection with the preparation of this composition.

Basically, there are two general methods of preparing basic calcium sulphonates. The first method is called simply a "two-step" method. According to this method, a colloidal dispersion of alkaline earth metal carbonate is formed and preferably, with a small amount of water in the presence of a small amount of alcohol. The second method is called simply a "one-step" method in which an admixture is formed of oil-soluble dispersing agent, nonvolatile diluent, alkaline earth metal compound, alcohol, and water. After treating the admixture with $CO_2$, the volatile materials are removed by distillation.

The charge (or starting) material for the two step process for preparing the thixotropic, grease-like composition is a colloidal dispersion of a calcium carbonate in a suitable diluent and having an acetic base number of at least 50.

While we have used the term calcium carbonate it may be well to mention that, although carbonate is the predominant anion, traces of other anions, e.g. hydroxide, oxide, and alkoxide, can be present. This is due to the fact that many processes for preparing dispersions of calcium carbonates involve carbonation of calcium hydroxide, oxide or alkoxide.

Many processes are known for preparing colloidal dispersions of calcium carbonates. Also, several processes are known for preparing colloidal dispersions of calcium carbonates, wherein calcium carbonate is formed in situ in the presence of the dispersing agent. It is characteristic of the products prepared by the in situ method that they have a uniform and small (i.e. 0.25 micron or less, and usually 0.10 micron or less) particle size.

In addition to the nonvolatile diluent, oil-soluble dispersing agent, and basic calcium compound, the colloidal dispersions may contain minor amounts of the alcohol which is employed in manufacturing the colloidal dispersion, and of the metal-containing intermediate which may be employed in manufacturing the colloidal dispersion.

A wide variety of nonvolatile diluents are suitable in the colloidal dispersions used as the starting material. The principal requisite desired in the nonvolatile diluent is that it will act as a solvent for the dispersing agent which is used. Examples of nonvolatile diluents which can be used include mineral lubricating oils obtained by any of the conventional refining procedures; liquid synthetic lubricating oils, vegetable oils, such as corn oil, cotton seed oil, and caster oil; animal oils, such as lard oil and sperm oil; and waxes, such as the petroleum waxes. Of the waxes, the microcrystalline waxes are preferred. Of the oils in the preceding examples, the mineral lubricating oils are preferred.

It should be noted that when a wax is used as the nonvolatile diluent, the colloidal dispersion is a solid at room temperature.

A variety of oil-soluble dispersing agents are suitable in the colloidal dispersions which are used in preparing the product used in the invention. Generic examples of suitable dispersing agents include oil-soluble sulfonic acids, carboxylic acids, and the metal salts thereof. The preferred dispersing agents for preparing the grease-like product used in the invention are the oil-soluble sulfonic acids and metal sulfonates.

The term "oil-soluble sulfonates," as used herein, refers to those sulfonates wherein the hydrocarbon portion of the molecule has a molecular weight in the range of about 300 to about 1,200. Preferably, this molecular weight is in the range of about 900 to about 1,100. These oil-soluble sulfonates can be either synthetic sulfonates or the so-called mahogany or natural sulfonates. The term "mahogany sulfonates" is believed to be well understood, since it is amply described in the literature. The term "synthetic sulfonates" refers to those sulfonates which are derived from sulfonation feedstocks which are prepared synthetically. The synthetic sulfonates include alkyl sulfonates and alkaryl sulfonates. The alkaryl radical can be derived from benzene, toluene, ethyl benzene, xylene isomers, or naphthalene. Preferably, the alkyl groups are branched chain.

Mixtures of sulfonates derived from alkaryl hydrocarbons having straight-chain alkyl groups and alkaryl hydrocarbons having branched-chain alkyl groups, and wherein the amount of sulfonate derived from branched-chain alkaryl hydrocarbons is at least 40 percent by weight, are particularly suitable. Preferably, the amount of sulfonate derived from branched chain alkaryls is at least 60 percent by weight.

An example of still another oil-soluble synthetic alkaryl sulfonate, which is particularly useful for preparing colloidal dispersions, is the sulfonate derived from a sulfonation feedstock which is referred to as "NAB Bottoms". NAB Bottoms are predominantly di-n-alkaryl, wherein the alkyl groups contain from eight to 18 carbon atoms. They distinguish primarily from the preceding sulfonation feedstocks in that they are straight-chain and contain a large amount of di-substituted material.

Other sulfonates which can be used in the colloidal dispersion employed as a starting material include, for example, mono- and poly-wax substituted naphthalene sulfonates, dinonyl naphthalene sulfonates, napthalene disulfide sulfonates, dicetyl thianthrene sulfonates, dilauryl betanaphthol sulfonates, unsaturated paraffin wax sulfonates, hydroxy substituted paraffin wax sulfonates, cyclo-aliphatic sulfonates, such as laurylcyclohexyl sulfonates, mono- and poly-wax substituted cyclohexyl sulfonates, and the like.

We have found that in order to obtain a composition applicable at high solids the calcium carbonate in the basic calcium sulphonate should be of an amorphous type with low calcite crystallinity. This morphology of the carbonate also contributes to the fluidity of the product at low temperature (i.e. below 40° C.), retention of adhesion to metal when incorporated into the terpolymer and enhances the ability to retain adhesion under stress at temperatures from $-40°$ C. to 120° C.

Calcium carbonate exists—essentially in 4 forms:

| Amorphous | Non crystalline |
|---|---|
| Arganite | |
| Vaterite | Crystalline |
| Calcite | | and the form of the calcium carbonate in basic calcium sulfonates may be established by centrifugation and infra red analysis, the wavelength numbers for the forms of calcium carbonate being

| Calcite | 884 $cm^{-1}$ |
|---|---|
| Vaterite | 879 $cm^{-1}$ |
| Amorphous | 860 $cm^{-1}$ |

In our preferred products the Calcium Sulphonate should have a low sedimentation value indicating little tendency for the particles to form associations which results in an increase of structure or rigid forces—an undesirable property for film forming substances requiring retained adhesion under stress at temperatures ranging from $-40°$ C. to $+12°$ C. In addition they preferably have no absorbtion at 884 $cm^{-1}$.

The preferred basic calcium sulfonate for use in the present invention is prepared by a process which results in a controlled crystalline growth where the three dimensional growth does not occur, but instead the crystallite formed is a flat, thin platelet.

The characteristics of the finished product (viscosity, degree of thixotropy) are closely tied up to the manufacturing process conditions especially temperature and time of carbonation
    carbonation and point
    cooling profile after solvent removal In our preferred process Methanol is first charged to the reactor; the calcium hydroxide is then added whilst stirring with the temperature between 15° and 27° C. (the dissolution of calcium hydroxide in methanol is slightly endothermic).

A solvent is then added and mixed with the calcium hydroxide/methanol suspension maintaining the temperature constant and finally the Sulfonic acid is added slowly and the reactor temperature adjusted in the range of 27°+2° C.

This mixture is then carbonated at 27°±2° C. The reaction heat is 28.3 Kcal/mole of $CO_2$. The total quantity of carbon dioxide should be injected at a constant feed rate in a minimum of time (3–4 hours). Typically a carbonation time of 3.5 hours is optimum; 4 hours should be considered as a maximum. Carbonation is continued until all the stoichiometric quantity of $CO_2$ has been absorbed; at that point, $CO_2$ is no longer absorbed and bubbles through the reaction mixture. $CO_2$ injection should be stopped at this breakpoint.

When the carbonation is completed, the reactor should be heated to reach about 60° C. in about one hour. When the temperature reaches 60° C., it is then cooled down to room temperature. At that point the characteristics of the reaction mixture are as follows:

| | |
|---|---|
| density at 20° C. | 0.95 |
| viscosity at 22° C. (cst) | 90 |
| at 40° C. (cst) | 60 |
| flash point (°C.) | 10 |
| sediments (vol %) | 2.8 |

Solids are removed from the reaction mixture by centrifugation.

After centrifugation the reaction mixture is taken back to the reactor for solvents removal. The distillation profile is not very important for the product characteristics. Reactor is heated from 20° C. to 140° C. When the temperature is 125° C., a slight nitrogen purging may be applied (20 m$^3$/m) in order to accelerate solvent removal.

The remaining solvent and water are stripped off by applying a reduced pressure (300 mm Hg, absolute) and a temperature of 140° C.

The product is stirred during the cooling operation and solvent added so as to obtain the desired TBN—(240 mg KOH/g). The product is scaled down to 0° C. The kinematic viscosity is then between 700 and 800 cst.

We have also found that when using a basic Calcium Sulphonate prepared in this way it contributes to the adhesion of the coating composition to metal.

Alternatively the basic sulphonate may be prepared by dispersing a non-crystalline or low crystalline calcium carbonate into the basic calcium sulphonate.

The terpolymer used in the blends of the present invention is preferably a copolymer of ethylene, an unsaturated carboxylic acid and at least one comonomer. The polymer should contain 50 to 98 wt. % ethylene which contributes to hydrophobicity, 1 to 20 wt. % unsaturated carboxylic acid preferably acrylic acid, methacrylic acid or maleic acid. The acid is believed to contribute to forming a reaction product with the calcium sulphonate to adhesion to the metal, to crosslinkability by neutralisation with metal ions (e.g. Ca, Mg, Zn, Na) or by appropriate crosslinking agents (e.g. diamines, di-epoxies) and also to oil-resistance and 1 to 30 wt. % of an ester comonomer which contributes to flexibility of the coating, to improved low temperature properties, to compatibility with apolar to weakly polar substances (and filler acceptance) and peroxide cross-linkability.

It is preferred that the terpolymer have a Brookfield viscosity at 190° C. of from 100 to 10000 mPas and a number average molecular weight of from 1000 to 10000. Our preferred terpolymer has a Brookfield viscosity at 190° C. of from 300 to 3000 mPas, a number average molecular weight of from 4000 to 8000, an unsaturated carboxylic acid content: 5 to 15 wt. % and an ester comonomer content of from 10 to 20 wt. %.

In particular we prefer that the unsaturated carboxylic acid is acrylic acid and the ester comonomer is vinyl acetate.

We have found that the compositions of our invention can be dissolved in conventional solvents to provide solutions containing greater than 60 wt. % solids, typically 60 to 70 wt. % solids and these solutions may be applied by conventional techniques to provide effective anti-corrosion and chip protection for metals and such a use is part of the present invention as are metals coated with the composition. In particular we find that effective coatings of a thickness as low as 100 microns or even lower may be produced. It is believed that the terpolymer provides high adhesion to the metal, high strength to the coating combined with flexibility and resistance to chipping. The calcium sulphonate, on the other hand, provides anticorrosive properties to the coating as well as being miscible with the terpolymer. A solution of the composition may be obtained at low solvent levels, less than 30% solvent, possibly less than 20%, the solution does not alter significantly in viscosity after recovery from temperature cycling from $-20°$ to $+20°$ C.

The viscosity and flexibility of the compositions of the present invention, their adhesion to metal, their hardness and thus resistance to chipping may be controlled by the inclusion of other components in the composition such as petroleum and terpene resins, soaps which may or may not be oxidised salts of oxidised paraffinic oils, alkenyl succinic anhydrides and rosin esters. The properties of the composition may also be controlled by chemical means such as cross-linking with peroxides, amines or anhydrides.

To better understand the properties provided by some of the preferred additional components the basic properties of these components are summarised as follows Calcium Soaps of Oxidised Paraffinic Oils The air oxidation of paraffinic oils in the presence of a promoting catalyst is well known for example a base oil such as 150 Solvent Neutral (STANCO 150) may be oxidised at a temperature of approx 140° C. using an air flow of 950 S.C.F./min/tonne using a manganese salt in the presence of potassium hydroxide solution as an oxidation promoter.

Typically oxidation is terminated when the following properties have been obtained.

| Property | Test Method | Property |
|---|---|---|
| Acid No mgKOH/gm | D974 | 45-50 |
| Saponification No MgKOH/gm | D94 | 110-130 |
| Viscosity K.V. wt 98.9° C. | D12 | 17-22 |
| Pour point °C. |  | −10 |

The oxidised Paraffinic oil may then be converted to the calcium soap using Ca (OH)$_2$ in excess of the amount necessary to neutralise the carbosylic acids and the formed soap is solubilised as a 80% concentrate in white spirit and filtered through an 80 micron screen. Typical properties of the soap are

| Appearance | Dark Viscous |
|---|---|
| Melt Point (Dry Soap) | 160° C. |
| Calcium Content % mass | 2.4 |
| Flash Point C.O.C. °C. | 43 |

Typical Viscosity, Brookfield R.V.T. spindle No.4 Temp 40° C.

| RPM | 2.5 | 5.0 | 10.0 | 20 | 50 | 100 |
|---|---|---|---|---|---|---|
| Viscosity (Poise) | 100 | 100 | 100 | 98 | 95 | 90 |

These Calcium Soaps of oxidised oils polymerise under heat to form a lacquer type film. Having a hardness as measured by the pencil scale (Paint Industry) of H thus they may be included into our coating composition to impart improved abrasion resistance to the coating.

Alkenyl Succinic Anhydride (ASA)

If ASA is used it preferably has the following formula

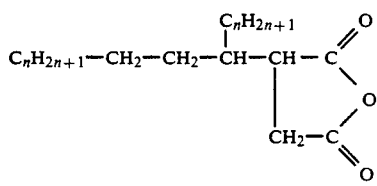

where m+n=12-17
and m may be zero.

ASA is soluble in acetone, benzene, petrol and ether. ASA is not soluble in water and its function in the formulation is believed to depend on its capacity to react with the residual water present in the basic Calcium Sulphonate and Calcium Soap of the oxidised oil when present. This hydrolysis reaction forms the alkenyl succinic acids as follows:

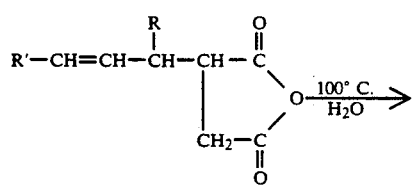

-continued

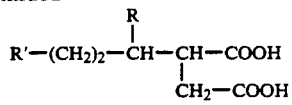

Acid hydrolysis converts the alkenyl diacids to 5 and 6 membered ring lactone acids e.g.

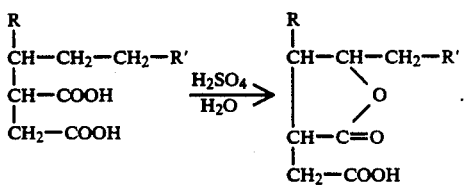

The presence of the A.S.A. contributes to accelerating the setting time of the composition and subsequent hardness and adhesion at temperatures above 140° C.

Dimerised Rosin Esters

Pentaerythritol Esters of Rosin are well known for their use as film formers in the adhesives industries. They are characterised by their high softening point (120°-140° C.) and solubility in aliphatic solvents and capacity to reduce the viscosities of the terpolymers of ethylene, vinyl acetate and acrylic acid.

The inclusion of resins ester in the compositions of the present invention promotes a mechanism for release of the solvent without forming discontinuities in the polar bonding of the film to the metal substrate.

The preferred compositions of the present invention therefore comprises 50 to 60 wt. % more preferably 20 to 60 wt. % of the basic calcium sulphonate 20 to 75 wt. % more preferably 20 to 60 wt. % of the terpolymer 1 to 40 wt. % of a calcium soap of an oxidised petrolatum 1 to 30 wt. % more preferably 1 to 5 wt. % of a dimerised rosin ester 1 to 5 wt. % of a alkyl succinic anhydride and a solution thereof containing from 60 to 0 wt. % solids.

The present invention is illustrated by the following Examples the terpolymer was blended with a calcium sulphonate free of calcite of total base number 240 and the blend evaluated for its rheological and adhesive properties. The polymer used in the composition was:

| a Random copolymer of ethylene, acrylic acid and vinyl acetate | |
|---|---|
| Brookfield viscosity at 190° C.: | 2800 mPa · s |
| Acrylic acid: | 16 wt. % |
| Vinyl acetate: | 7 wt. % |
| Acid Number: | 100 mgKOH/grm |

The compositions were prepared by the following steps

1. Into a glass vessel equipped with a paddle mixer and overhead condenser was charged 500 parts of a basic calcium sulphonate having the following properties.

| Property | Test Method | Property |
|---|---|---|
| Calcium Sulfonate % mass | D3712 | 24.5 |
| Total Base No mgKOH/gm | D2896 | 265 |
| H$_2$O Content | D 95 | 0.2 |

-continued

| Property | Test Method | Property |
| --- | --- | --- |
| Mineral Oil % mass | D3712 | 3.3 |
| Mineral Spirit (W. Spirit) | | 50.0 |
| Sedimentation Vol. % | HMS 77.081 | 0.1 |
| K.V. 60° C. cSt | D445 | 2,000 |
| Brookfield Vis °C. CPS | | 10,000 |
| (No 4 spindle at 0.3 RPM) | | |
| Density at 15° C. kg/m₃ | D1298 | |
| 980 | | |

The temperature was increased to 60° C. with stirring.

The temperature was increased to 60° C. with stirring.

2. To the Calcium Sulphonate was added 5 grams of the polymer. The temperature was increased to 150° C. Solvent was returned to the charge to maintain equilibrium. A nitrogen purge was used to assist in the removal of the water of reaction—mixing time 20 mins.

3. The temperature was reduced to 80° C. and the 69OHP oxidate was added after preheating to 70° C.

4. The mixing temperature was increased to 120° C. and the water of reaction removed under nitrogen purge over 20 minutes at 120° C.

5. The mixing temperature was reduced to 80° C. and the 150-20-70 calcium soap was added and blended over a period of 15 mins. at 80° C.

The blend had the following properties

| Drop melting point after solvent evaporation | | | | 130° C. | |
| --- | --- | --- | --- | --- | --- |
| Total base no. of product including solvent mg/KOH/gm | | | | 117 | |
| Brookfield viscosity including solvent at 25° C. Spindle No. 4 | | | | | |
| R.P.M. | 5 | 10 | 20 | 50 | 100 |
| Viscosity | 128 | 96 | 68 | 48 | 36 |

The performance of the products as anticorrosion coatings was evaluated under the following tests

A. Sag Resistance

A 50 micron dry film coating was sprayed on to a "Q" test panel with 30% of the surface area taped with an adhesive mask and allowed to dry over 4 hours.

The masking tape was removed and the panel was placed in an oven and heated to 160° over 2 hours.

Result—No sagging of the applied film

B. Cold Bend Flexibility

The coated panel after removal from the oven at 160° C. was chilled to −25° C. then subjected to cold bending for 30 minutes over a ⅛ inch mandrel.

The applied film remained intact during and after this test.

C. ASTM B117 Salt Fog Resistance

A 50 micron dry film was applied to "Q" test panels and subjected to salt fog exposure according to the test ASTM B117 and there was no corrosion after 600 hours.

We claim:

1. A solution which comprises:
   (a) a blend of (i) from 10 to 90 parts by weight of basic calcium sulphonate and (ii) from 90 to 10 parts by weight of a terpolymer of 50 to 99 wt. % of an olefin containing from 2 to 4 carbon atoms, 1 to 30 wt. % of an unsaturated ester which is a vinyl ester of a carboxylic acid or an ester of acrylic or methacrylic acid and 1 to 20 wt. % of an unsaturated carboxylic acid optionally containing other materials; and
   (b) a solvent for said blend.

2. A solution according to claim 1 containing more than 60 wt. % solids.

* * * * *